United States Patent
John et al.

(10) Patent No.: US 10,427,681 B2
(45) Date of Patent: Oct. 1, 2019

(54) METHOD AND APPARATUS TO CONTROL VEHICLE DECELERATION DURING ADAPTIVE CRUISE CONTROL

(71) Applicant: Bendix Commercial Vehicle Systems LLC, Elyria, OH (US)

(72) Inventors: Mathew J John, Avon, OH (US); Vipin A Guda, Avon Lake, OH (US); Thomas S Miller, Jr., Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 241 days.

(21) Appl. No.: 15/688,158

(22) Filed: Aug. 28, 2017

(65) Prior Publication Data
US 2019/0061754 A1    Feb. 28, 2019

(51) Int. Cl.
*G06F 7/70* (2006.01)
*B60W 30/14* (2006.01)
(Continued)

(52) U.S. Cl.
CPC ........ *B60W 30/143* (2013.01); *B60W 30/188* (2013.01); *B60W 30/18109* (2013.01);
(Continued)

(58) Field of Classification Search
CPC ............. B60W 30/143; B60W 30/188; B60W 30/18109; B60W 40/04; B60W 2750/308; B60W 2550/308; B60W 2520/10
(Continued)

(56) References Cited

U.S. PATENT DOCUMENTS 5,303,986 A * 4/1994 VanDeMotter ........... B60T 8/00
 303/15
6,062,658 A * 5/2000 Stumpe .................... B60T 8/00
 303/15
(Continued)

FOREIGN PATENT DOCUMENTS

DE     102015211995 A1   12/2016

OTHER PUBLICATIONS

Bendix Commercial Vehicle Systems LLC, "Bendix Wingman Fusion Driver Assistance System," SD-61-4963 Service Data Sheet, Jul. 2016, 84 pages, Bendix Commercial Vehicle Systems LLC, Elyria Ohio, U.S.A.
(Continued)

*Primary Examiner* — Shardul D Patel
(74) *Attorney, Agent, or Firm* — Cheryl Greenly; Brian Kondas; Eugene Clair

(57) ABSTRACT

A controller for a host vehicle having adaptive cruise control comprises control logic that determines an actual time gap behind a detected target object and transmits a deceleration message having a deceleration value in response to the actual time gap being less than a predetermined minimum time gap. The control logic receives a torque message from a vehicle retarder indicating that the vehicle retarder is at a limit. If the actual time gap is less than the predetermined minimum time gap, the control logic transmits a transmission control message requesting the transmission to shift to a lower gear. The control logic transmits another deceleration message if the actual time gap is still less than the predetermined minimum time gap, wherein at least one of an associated transmission and an associated braking system respond to decelerate the host vehicle in response to the transmission control message and deceleration messages.

16 Claims, 3 Drawing Sheets

(51) Int. Cl.
*B60W 30/18* (2012.01)
*B60W 30/188* (2012.01)
*B60W 40/04* (2006.01)

(52) U.S. Cl.
CPC ......... *B60W 40/04* (2013.01); *B60W 2520/10* (2013.01); *B60W 2550/308* (2013.01); *B60W 2750/308* (2013.01)

(58) Field of Classification Search
USPC .............. 701/48, 70, 160; 188/355; 340/435
See application file for complete search history.

(56) References Cited

U.S. PATENT DOCUMENTS

| | | | | |
|---|---|---|---|---|
| 6,231,474 B1 * | 5/2001 | Hawarden | ....... | B60W 30/18136 |
| | | | | 477/118 |
| 6,249,733 B1 * | 6/2001 | Smith | ................... | B60T 13/585 |
| | | | | 475/118 |
| 6,695,416 B1 * | 2/2004 | Reiner | ...................... | B60T 8/00 |
| | | | | 303/125 |
| 10,214,210 B2 * | 2/2019 | John | ................... | B60W 30/143 |
| 2003/0195667 A1 * | 10/2003 | Tange | ................ | B60K 31/0008 |
| | | | | 701/1 |
| 2008/0172162 A1 * | 7/2008 | Wegeng | .................. | B60T 10/02 |
| | | | | 701/70 |
| 2012/0175200 A1 * | 7/2012 | Sagan | ...................... | B60T 1/10 |
| | | | | 188/159 |
| 2017/0297549 A1 * | 10/2017 | Huang | .................. | B60T 13/745 |

OTHER PUBLICATIONS

Bendix Commercial Vehicle Systems LLC, "Bendix ESP EC-80 Controller," SD-13-4986 Service Data Sheet, Jul. 2015, 64 pages, Bendix Commercial Vehicle Systems LLC, Elyria Ohio, U.S.A.

* cited by examiner

METHOD AND APPARATUS TO CONTROL VEHICLE DECELERATION DURING ADAPTIVE CRUISE CONTROL

BACKGROUND

The present invention relates to embodiments of an adaptive cruise control system capable of transmitting vehicle gear transition messages and brake control message during deceleration in case of inadequate retarder response or a retarder malfunction. When an adaptive cruise control system determines that vehicle deceleration is necessary to maintain a time to target, it will begin transmitting deceleration messages to vehicle subsystems, such as the retarder, the engine and the braking system, to assist with vehicle deceleration. If deceleration is not occurring at the rate expected by the adaptive cruise control system because the time to target keeps getting smaller, heavy braking may be requested. Heavy braking causes sudden g-force changes that can shock the vehicle operator. There is a need for an adaptive cruise control system that mitigates sudden g-forces when decelerating.

SUMMARY

Various examples of a controller for a host vehicle comprise an input for receiving a signal indicative of a detected target object; a communications port for transmitting and receiving messages; and control logic. The control logic is adapted to determine an actual time gap behind the detected target object; transmit an initial deceleration message having a deceleration value at the communications port in response to the actual time gap being less than a predetermined minimum time gap and receive a torque message from a vehicle retarder indicating that the vehicle retarder actual torque is less than a requested torque value. The control logic is also adapted to determine the actual time gap is less than the predetermined minimum time gap; receive an engine speed value at the communications port; transmit a transmission control message requesting the transmission to shift to a lower gear in response to the engine speed being less than or equal to a minimum engine speed value; and transmit another deceleration message in response to the actual time gap being less than the predetermined minimum time gap, wherein at least one of an associated transmission and an associated braking system respond to decelerate the host vehicle in response to the transmission control message and the deceleration messages.

In accordance with another example, a braking system controller for a host vehicle comprises an output for controlling a service brake system; a communications port for transmitting and receiving messages and control logic. The control logic is adapted to receive a deceleration message at the communications port; transmit an engine limiting message at the communications port in response to the deceleration message; transmit a retarder control message having a requested torque value at the communications port in response to the deceleration message. The control logic is also adapted to receive an actual torque value message from the vehicle retarder; receive another deceleration message at the communications port and transmit a braking control signal to the output at a determined torque level in response to the actual torque value being less than the requested torque value.

In accordance with another aspect, various examples of a method for controlling a host vehicle having an adaptive cruise control system comprise receiving a signal indicative of a target object; determining an actual time gap behind the detected target object; transmitting a first deceleration message having a first deceleration value in response to the actual time gap being less than a predetermined minimum time gap and receiving a torque message from a vehicle retarder indicating that the vehicle retarder actual torque value is less than a requested torque value. The method also comprises determining the actual time gap is less than the predetermined minimum time gap; receiving an engine speed value; transmitting a transmission control message requesting the transmission to shift to a lower gear in response to the engine speed being less than or equal to a minimum engine speed value and transmitting another deceleration message having a second deceleration value in response to the actual time gap being less than the predetermined minimum time gap.

In accordance with another example, a system for maintaining a predetermined time gap between a host vehicle and a target comprises an adaptive cruise controller communicating on a vehicle communications bus; a retarder controller communicating on the vehicle communications bus; a transmission controller communicating on the vehicle communications bus and a braking system controller communicating on the vehicle communications bus. The adaptive cruise controller transmits a deceleration message in response to an actual time gap being less than a predetermined minimum time gap behind a detected target object. The braking system controller transmits a retarder message having a requested torque value to the retarder controller in response to the deceleration message. The adaptive cruise controller receives an actual torque message having an actual torque value from the retarder controller, wherein the received torque message indicates that the actual torque value is less than the requested torque value; receives an engine speed value at the communications port and transmits a transmission control message to the transmission controller to request a shift to a lower gear in response to the engine speed being less than or equal to a minimum engine speed value.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
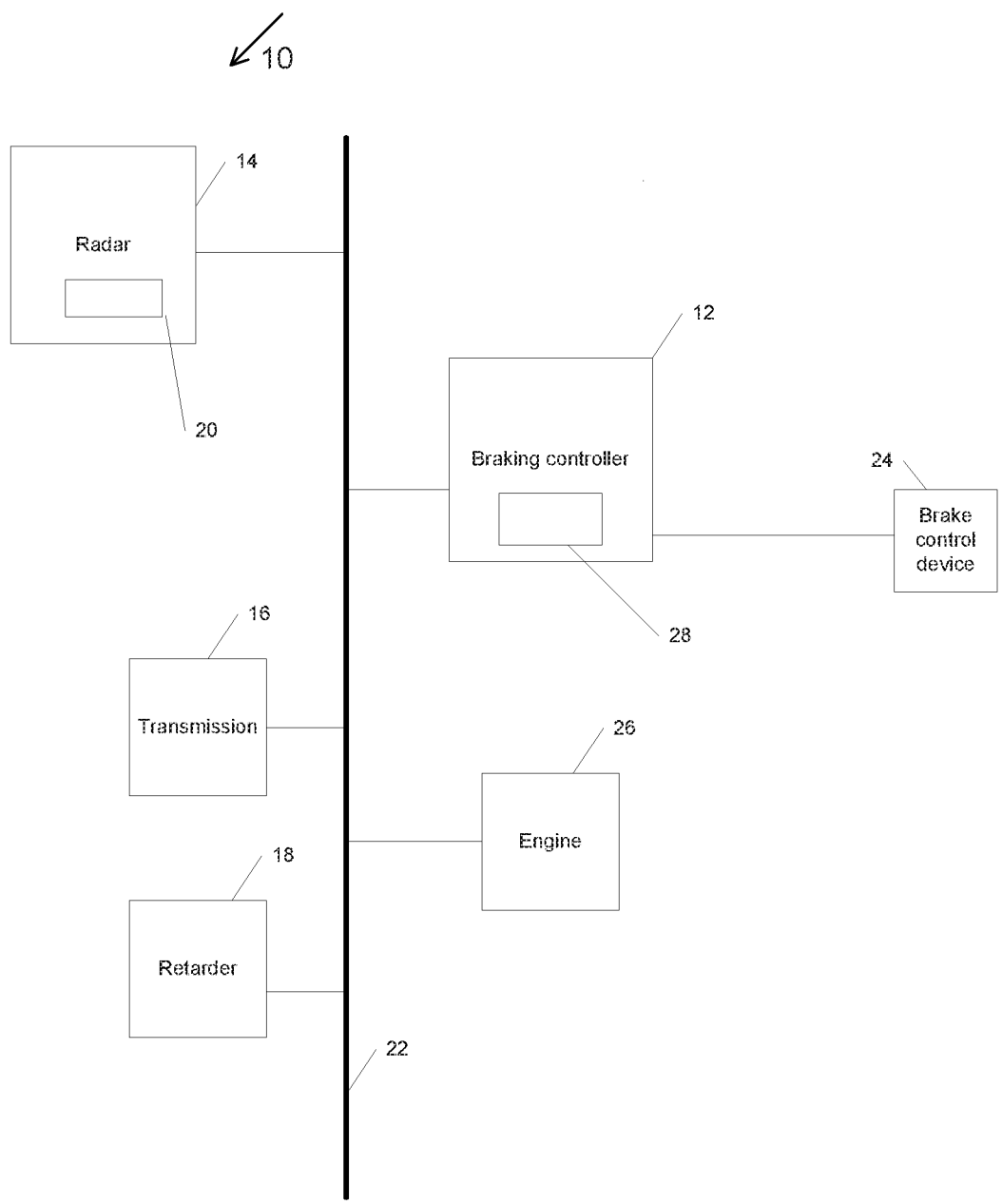
FIG. 1 illustrates a vehicle system having an adaptive cruise control system according to the present invention.

FIG. 1 illustrates an adaptive cruise control with braking (ACB) system 10 as would be installed on a host vehicle. The ACB 10 includes a radar controller 14. The radar controller 14 transmits and receives radar signals, which are electromagnetic waves used to detect an object's presence, longitudinal distance, lateral distance, speed and direction with respect to the host vehicle. The radar controller 14 can detect multiple stationary or moving objects within a wide range to the front and sides of the host vehicle. The radar and control functions may be in a single controller or the radar function may be in a separate sensing device. The radar controller 14 may be of the type used in the Bendix® Wingman® Fusion™ Driver Assistance System from Bendix Commercial Vehicle Systems LLC of Elyria Ohio. The ACB 10 may also comprise a camera controller, a laser controller or other means of determining an object's presence and location around a host vehicle.

The radar controller 14 includes a processor with control logic 20 for receiving and transmitting messages to control the ACB 10 and other subsystems on the host vehicle. The control logic 20 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 20.

When adaptive cruise control is enabled by a driver, the control logic 20 may be configured in a speed mode, a time gap mode or a following distance mode. In a time gap mode, when the calculated time to a detected target vehicle is below a predetermined time, a following alert is transmitted as a threat of a possible collision with the target vehicle exists due to the changing longitudinal distance, lateral distance and relative velocity of the target vehicle with respect to the host vehicle. The control logic 20 may intervene automatically by transmitting multiple deceleration messages to decelerate the vehicle in order to maintain the preset time gap. The control logic 20 may also intervene automatically by transmitting messages to accelerate the vehicle in order to maintain the preset time gap behind the target vehicle or to maintain the host vehicle speed in the absence of a target vehicle.

The ACB 10 communicates using a public vehicle communications bus 22 connected to the radar controller 14 and other controllers on the vehicle. The vehicle communications bus 22 may be configured to use the SAE J1939 standard or other standard vehicle communications protocol. The radar controller 14 may transmit a deceleration request message and a transmission control message on the vehicle communications bus 22. The radar controller 14 can also transmit a braking activity indicator, a distance to the detected object and a status signal to the vehicle communications bus 22.

A braking system controller 12 communicates with the ACB 10 via the vehicle communications bus 22. The braking system controller 12 receives deceleration messages and controls the service brakes of the host vehicle. The braking system controller 12 may also transmit retarder torque control and engine control messages in response to the deceleration messages. The braking system controller 12 may also communicate the speed of the host vehicle on the vehicle communications bus 22. The braking system controller 12 includes an output for communicating with at least one brake control device 24. The at least one brake control device 24 may be an electro-pneumatic device that provides air to the service brakes on a wheel end in response to control signals from the braking system controller 12 when the host vehicle is an air-braked commercial vehicle. The braking system controller 12 may be of the type used in the Bendix® ABS-6 Advanced with ESP® System from Bendix Commercial Vehicle Systems of Elyria Ohio.

The braking system controller 12 includes a processor with control logic 28 for receiving and transmitting messages and control signals to control the service braking system and other subsystems on the host vehicle. The control logic 28 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 28.

A transmission controller 16 communicates with the ACB 10 via the vehicle communications bus 22. The transmission controller 16 receives transmission control messages regarding requested vehicle gear downshifts and upshifts and may change the operating gear of the associated transmission according to its own internal operating processes. The transmission may be an automated manual or automatic transmission.

A retarder controller 18 communicates with the ACB 10 via the vehicle communications bus 22. The retarder controller 18 receives retarder torque control messages having a requested torque value and assists in slowing the vehicle by affecting the engine or driveline performance. The retarder controller 18 may also communicate actual retarder torque values to the vehicle communications bus 22. The retarder itself may be an engine retarder, an exhaust retarder, a driveline retarder or other type of retarder that serves to slow or maintain the speed of the host vehicle.

An engine controller 26 communicates with the ACB 10 via the vehicle communications bus 22. The engine controller 26 is capable of receiving engine control messages requesting deceleration of the vehicle and will slow the vehicle in response. The engine controller 26 also receives engine control messages requesting acceleration and propels the vehicle in response. The engine controller 26 may also transmit the speed of the host vehicle and the actual engine speed on the vehicle communications bus 22.

When a target vehicle is detected by the radar controller 14, the ACB 10 transmits messages to one or more of the braking system controller 12, the retarder controller 18, the transmission controller 16 and the engine controller 26 to maintain the host vehicle at greater than or equal to a preset time gap (e.g., 2.8 seconds or the like) behind the target vehicle when the control logic 20 is in the time gap mode.

Therefore, a controller for a host vehicle having adaptive cruise control comprises an input for receiving a signal indicative of a detected target object, a communications port for transmitting and receiving messages and control logic. The control logic is adapted to determine an actual time gap behind the detected target object and transmit an initial deceleration message having a deceleration value at the communications port in response to the actual time gap being less than a predetermined minimum time gap.

In another example, a braking system controller for a host vehicle comprises an output for controlling a service brake system, a communications port for transmitting and receiving messages and control logic. The control logic is adapted to receive a deceleration message at the communications port, transmit an engine limiting message at the communications port in response to the deceleration message and transmit a retarder control message having a requested torque value at the communications port in response to the deceleration message. The control logic may also transmit a braking control signal to an associated brake control device.

Figure 2:
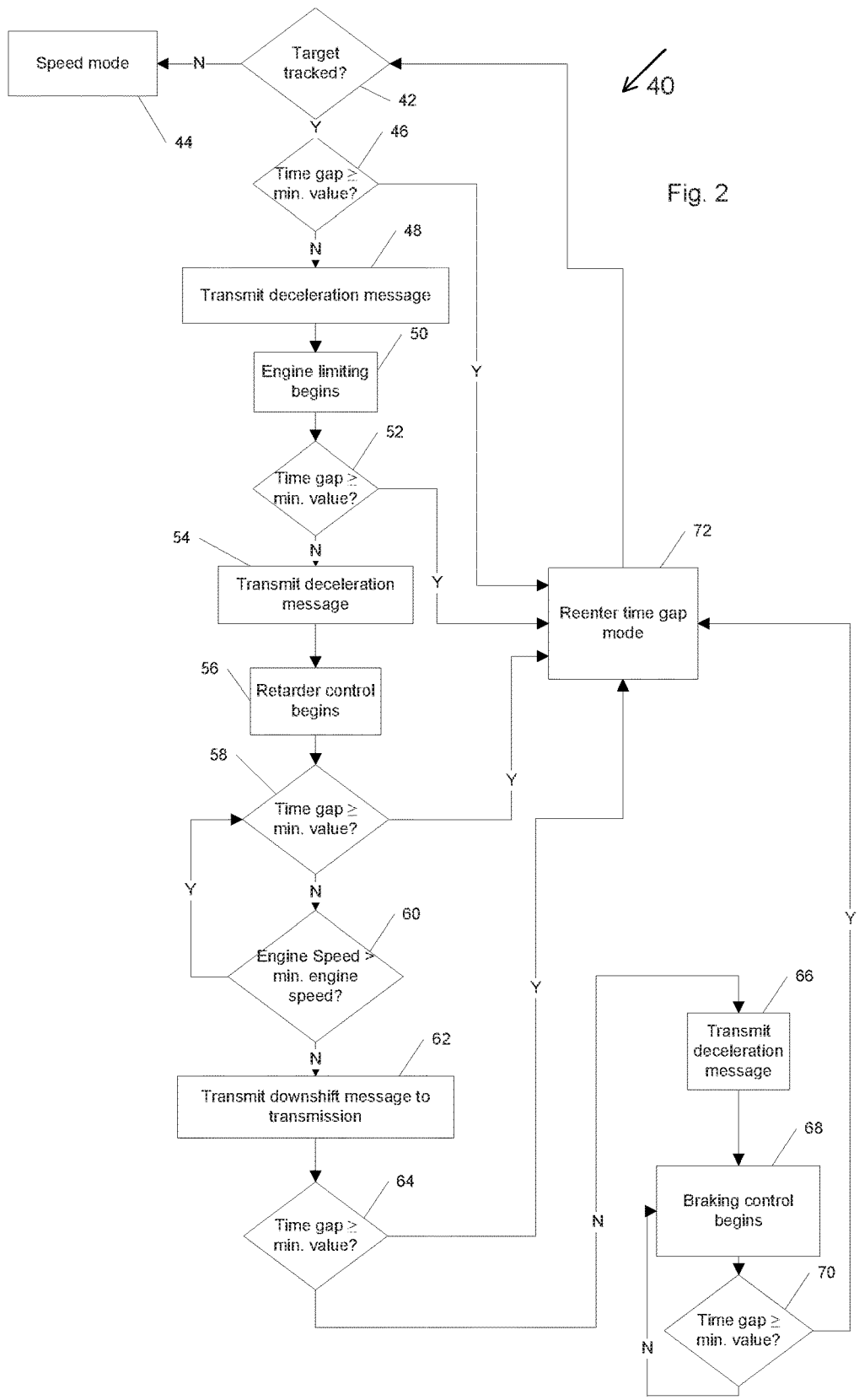
FIG. 2 illustrates a method of implementing the invention, according to one example.

FIG. 2 illustrates a method 40 to control a vehicle having ACB 10 and using the retarder, the brakes, the engine and the transmission according to one example of the present invention. In step 42, the radar controller 14 determines if a target is present. If no target vehicle is available to be tracked, the method continues to step 44 with the radar controller 14 in the speed mode. The engine controller 26 also maintains the host vehicle at a preset speed.

If a target vehicle is present to be tracked, the method 40 proceeds to step 46, wherein the target vehicle will be tracked by the radar controller 14. A preset time gap between the target vehicle and the host vehicle may be maintained through the use of communication between the radar controller 14 and the engine controller 26. In one example, the predetermined minimum time gap value can be set to be 2.8 seconds, which is the time it would take the host vehicle to reach the target vehicle if the target vehicle were to stop suddenly and the host vehicle were to maintain its current velocity. The minimum predetermined time gap value can be set by the driver of the vehicle or may be set by the radar controller manufacturer.

In step 46, the actual time gap between the target vehicle and the host vehicle is measured against the predetermined minimum time gap value. As long as the actual time gap is greater than or equal to the minimum predetermined time gap value, the method 40 goes to step 72 to maintain or reenter the time gap mode. The method returns to step 42 to continue to track the target vehicle. If the actual time gap is less than the predetermined minimum time gap value, the method 40 continues to step 48.

In step 48, the radar controller 14 transmits an initial deceleration message. The deceleration message includes a deceleration request that the control logic 20 determined was necessary to increase the actual time gap value above the predetermined minimum time gap value. In general, the braking system controller 12 acts on the deceleration request first by limiting the engine, as in step 50.

In step 52, the actual time gap between the target vehicle and the host vehicle is measured against the predetermined minimum time gap value again. As long as the actual time gap is greater than or equal to the minimum predetermined time gap value, the method 40 goes to step 72 to maintain or reenter the time gap mode. If the actual time gap is less than the predetermined minimum time gap value, the method 40 continues to step 54.

In step 54, the radar controller 14 transmits another deceleration message. The next deceleration message includes a deceleration value that the control logic 20 determined was necessary to maintain the actual time gap value above the predetermined minimum time gap value. The deceleration value may be greater than the deceleration value in the deceleration message transmitted first because the radar controller 14 determined that the initial deceleration value was not sufficient to decelerate the vehicle.

The braking system controller 12 will act on the next deceleration message by transmitting a requested torque message value having a negative torque value designated for the retarder controller 18, as in step 56. For example, the braking system controller 12 may request a 100% reduction in retarder torque. The retarder controller 18 will respond by providing negative torque to decelerate the vehicle in an attempt to meet the deceleration request. The expectation is that the actual time gap would then increase above the minimum preset time gap value as the host vehicle decelerates in response to the retarder limiting the engine, the exhaust or the driveline.

In step 58, the actual time gap between the target vehicle and the host vehicle is measured against the predetermined minimum time gap value again. As long as the actual time gap is greater than or equal to the minimum predetermined time gap value, the method 40 goes to step 72 to maintain or reenter the time gap mode. If the actual time gap is less than the predetermined minimum time gap value, the method 40 continues to step 60.

Reasons why a retarder by itself may not be able to apply the requested negative torque that would result in the desired deceleration of the host vehicle include: the host vehicle is ascending a grade, the target vehicle is slowing or the retarder does not achieve the torque value due to a failure in the retarder itself. In some low speed situations, retarder torque may not be available.

In step 60, the control logic 20 receives the engine speed on the vehicle communications bus 22. The engine speed is compared to a minimum engine speed. If the engine speed is greater than the minimum engine speed, the method 40 returns to step 58 to continue to monitor the actual time gap value against the minimum predetermine time gap value. If the engine speed is less than or equal to the minimum engine speed, the method 40 proceeds to step 60. In one example, the minimum engine speed is set to about 600 rpm.

In step 62, the radar controller 14 transmits a transmission control message to the transmission controller 16 on the vehicle communications bus 22 requesting that the transmission downshift. Downshifting the transmission will naturally cause a reduction in the vehicle forward velocity. The transmission may downshift by one or more gears, depending on the received message. The transmission controller 16 downshifts according to its own control algorithm, as is known.

In step 64, the actual time gap between the target vehicle and the host vehicle is measured against the predetermined minimum time gap value again. As long as the actual time gap is greater than or equal to the minimum predetermined time gap value, the method 40 goes to step 72 to maintain or reenter the time gap mode. If the actual time gap is less than the predetermined minimum time gap value, the method 40 continues to step 66.

In step 66, the radar controller 14 transmits another deceleration message. At this point, a braking intervention is necessary in order to increase the actual time gap behind a target vehicle. In step 68, the braking system controller 12 will respond to this third deceleration message by activating the service brakes of the host vehicle to deceleration the host vehicle. In one example, the torque used to brake the vehicle will be proportionate to the torque requested of the retarder minus the actual retarder torque value as received on the vehicle communications bus 22. In this manner, the braking system controller 12 will respond by activating the at least one brake control device 24 to actuate the service brakes of the host vehicle proportionate to the difference in the torque values.

In one example, the transmission downshift may continue to be transmitted simultaneously so that as the vehicle slows in response to the braking action, the transmission is also downshifting to slow the vehicle and prevent an engine stall. In this manner, the service braking function is blended with the downshifting and retarder functions to smoothly decel-eration the vehicle.

The method 40 continues with step 70 where the actual time gap between the target vehicle and the host vehicle is measured against the predetermined minimum time gap value again. As long as the actual time gap is greater than or equal to the minimum predetermined time gap value, the method 40 goes to step 72 to maintain or reenter the time gap mode. From step 72, method 40 returns to step 42 to continue to track the target vehicle.

If the actual time gap is less than the predetermined minimum time gap value, the method 40 returns to step 68 where the braking system controller 12 continues to actuate the service brakes until the actual time gap value is greater than or equal to the predetermined minimum time gap value. Alternatively, the host vehicle may have come to a complete stop, such that no additional deceleration messages would be acted upon.

Therefore, a method for controlling a host vehicle comprises receiving a signal indicative of a target object; determining an actual time gap behind the detected target object; transmitting a deceleration message having a deceleration value in response to the actual time gap being less than a predetermined minimum time gap; receiving a torque message from a vehicle retarder indicating that the vehicle retarder is at a limit; determining the actual time gap is less than the predetermined minimum time gap; receiving an engine speed value; transmitting a transmission control message requesting the transmission to shift to a lower gear in response to the engine speed being less than or equal to a minimum engine speed value; and transmitting another deceleration message in response to the actual time gap being less than the predetermined minimum time gap.

Figure 3:
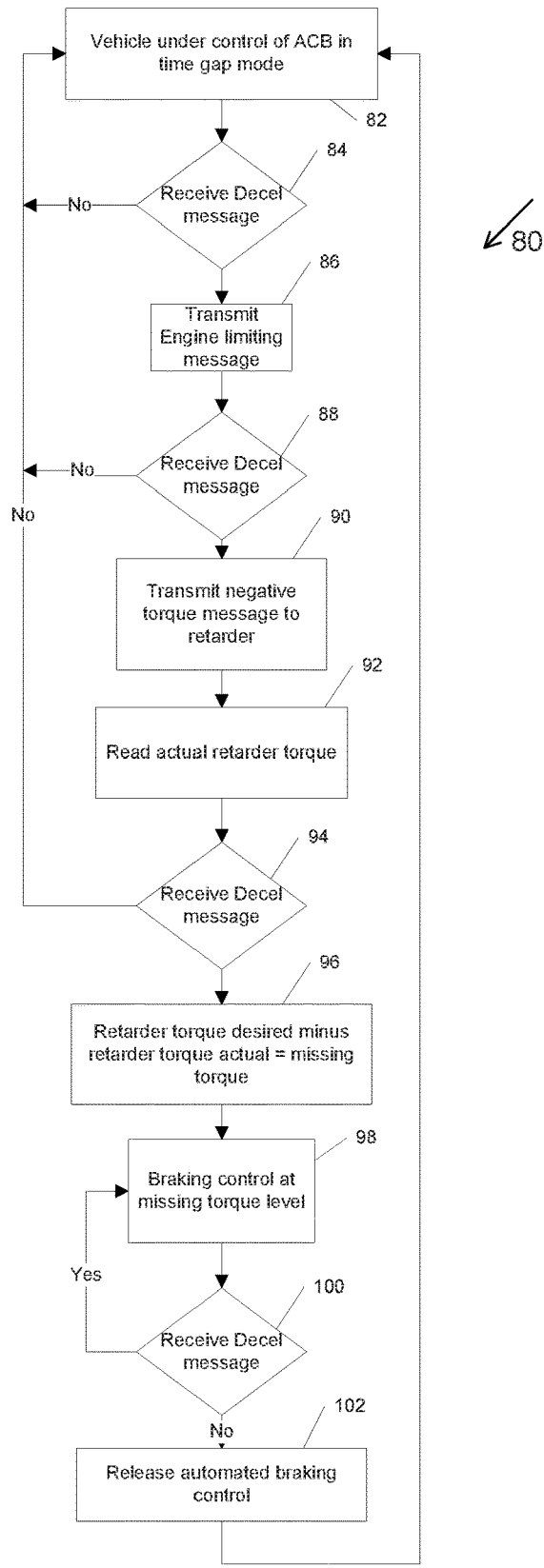
FIG. 3 illustrates a method of implementing the invention, according to another example.

FIG. 3 illustrates a method 80 to control a vehicle through the braking system controller 12, using the adaptive cruise control with braking, the retarder, the brakes, the engine and the transmission according to another example of the present invention. In step 82, the host vehicle is under the control of ACB 10 and in a time gap mode.

When the actual time gap is less than the predetermined minimum time gap value, the radar controller 14 transmits a deceleration message, which is received by the braking system controller 12 in step 84. The deceleration message includes a deceleration value that the control logic 20 of the radar controller 14 determined was necessary to maintain the actual time gap value above the predetermined minimum time gap value. In general, the control logic 28 of the braking system controller 12 acts on the deceleration request first by limiting the engine torque, as in step 86. Engine torque limiting is accomplished by known methods.

In step 88, the braking system controller 12 receives another deceleration message. This deceleration message includes a deceleration request that the control logic 20 of the radar controller 14 determined was necessary to maintain the actual time gap value above the predetermined minimum time gap value. The deceleration value of the second deceleration request may be greater than the deceleration value requested in the first deceleration message because the radar controller 14 determined that the first response of the engine torque limiting was not sufficient to decelerate the vehicle to maintain the predetermined minimum time gap.

The control logic 28 of the braking system controller 12 will act on the second deceleration message by transmitting a negative torque request designated for the retarder controller 18, as in step 90. For example, the control logic 28 may request a 100% reduction in retarder torque. The retarder controller 18 of the retarder will respond by providing negative torque to decelerate the vehicle in an attempt to meet the deceleration request. The expectation is that the actual time gap would then increase above the minimum preset time gap value as the host vehicle decelerates in response to the retarder limiting the engine, the exhaust or the driveline. The retarder controller 18 will transmit an actual retarder torque value on the vehicle communications bus 22.

In step 94, the braking system controller 12 receives another deceleration message. At this point, a braking intervention is necessary in order to increase the actual time gap behind a target vehicle. In step 68, the braking system controller 12 will respond to this deceleration message by activating the service brakes of the host vehicle to deceleration the host vehicle. In one example, the torque used to brake the vehicle will be proportionate to the desired torque requested of the retarder controller 18 minus the actual retarder torque value as received on the vehicle communications bus 22. In step 96, the actual retarder torque as transmitted by the retarder controller 18 is subtracted from the desired retarder torque as transmitted by the braking system controller 12 to obtain a missing torque value. In step 98, the braking system controller 12 will respond by activating the at least one brake control device 24 to actuate the service brakes of the host vehicle proportionate to the difference in the torque values. This brake blending method results in a smoother deceleration and less g-force acting on the driver of the vehicle.

The method 80 continues with step 100 where yet another deceleration message may be received because the actual time gap is still less than the predetermined minimum time gap value. In response to the deceleration message, the braking system controller 12, continues to actuate the service brakes in step 98 until no further deceleration messages are received.

If no deceleration messages are received in step 100, the method 80 proceeds to step 102 and the automated braking control by the braking system controller 12 is discontinued. Alternatively, the host vehicle may have come to a complete stop, such that no additional deceleration messages would be acted upon.

In this manner, braking of the host vehicle is used last to maintain the predetermined minimum time gap so that the deceleration of the host vehicle remains as smooth as possible first through retarder action and then through downshifting. In this manner, the radar controller is not only relying on the retarder response for slowing the vehicle as a problem with the retarder may go undetected by the radar controller.

Therefore, a method of controlling a host vehicle having a braking control system comprises receiving a plurality of deceleration messages at the communications port; transmitting an engine limiting message at the communications port in response to a first of the plurality of deceleration messages and transmitting a retarder control message having a requested torque value at the communications port in response to a second of the plurality of deceleration messages. The method further comprises receiving an actual torque value message from the vehicle retarder; receiving a third of the plurality of deceleration messages at the communications port; and transmitting a braking control signal to the output at a torque level equivalent to the difference between the requested torque value and the actual torque value.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for a host vehicle having adaptive cruise control comprising:
 an input for receiving a signal indicative of a detected target object;
 a communications port for transmitting and receiving messages; and control logic adapted to:
  determine an actual time gap behind the detected target object;
  transmit a deceleration message having a deceleration value at the communications port in response to the actual time gap being less than a predetermined minimum time gap;
  receive a torque message from a vehicle retarder indicating that the vehicle retarder actual torque value is less than a requested torque value;
  determine the actual time gap is less than the predetermined minimum time gap;
  receive an engine speed value at the communications port;
  transmit a transmission control message requesting the transmission to shift to a lower gear in response to the engine speed being less than or equal to a minimum engine speed value; and
  transmit another deceleration message in response to the actual time gap being less than the predetermined minimum time gap, wherein at least one of an associated transmission and an associated braking system respond to decelerate the host vehicle in response to the transmission control message and the deceleration messages.

2. The controller as in claim 1, wherein the control logic is further adapted to transmit transmission control messages and deceleration messages until the actual time gap is greater than or equal to the predetermined minimum time gap.

3. The controller as in claim 1, wherein each deceleration message has a different deceleration value.

4. The controller as in claim 1, wherein the subsequent deceleration messages have a deceleration value less than the deceleration value of the initial deceleration message.

5. The controller as in claim 1, wherein the predetermined minimum time gap is about 2.8 seconds.

6. A braking system controller for a host vehicle comprising:
  an output for controlling a service brake system;
  a communications port for transmitting and receiving messages; and
  control logic adapted to:
    receive a deceleration message at the communications port;
    transmit an engine limiting message at the communications port in response to the deceleration message;
    transmit a retarder control message having a requested torque value at the communications port in response to the deceleration message;
    receive an actual torque value message from the vehicle retarder;
    receive another deceleration message at the communications port; and
    transmit a braking control signal to the output at a determined torque level in response to the deceleration messages.

7. The braking system controller as in claim 6, wherein at least one of a brake control device actuates in response to the braking control signal.

8. The braking system controller as in claim 6, wherein the determined torque level is the difference between the requested torque value and the actual torque value.

9. A method for controlling a host vehicle having an adaptive cruise control system comprising:
  receiving a signal indicative of a target object;
  determining an actual time gap behind the detected target object;
  transmitting a deceleration message having a first deceleration value in response to the actual time gap being less than a predetermined minimum time gap;
  receiving a torque message from a vehicle retarder indicating that the vehicle retarder actual torque value is less than a requested torque value;
  determining the actual time gap is less than the predetermined minimum time gap;
  receiving an engine speed value;
  transmitting a transmission control message requesting the transmission to shift to a lower gear in response to the engine speed being less than or equal to a minimum engine speed value; and
  transmitting another deceleration message having a second deceleration value in response to the actual time gap being less than the predetermined minimum time gap.

10. The method as in claim 9, wherein at least one of an associated transmission and an associated braking system respond to decelerate the host vehicle in response to the transmission control message and the deceleration messages.

11. A method for controlling a host vehicle having a braking control system comprising:
  receiving a plurality of deceleration messages at the communications port;
  transmitting an engine limiting message at the communications port in response to a first of the plurality of deceleration messages;
  transmitting a retarder control message having a requested torque value at the communications port in response to a second of the plurality of deceleration messages;
  receiving an actual torque value message from the vehicle retarder;
  receiving a third of the plurality of deceleration messages at the communications port; and
  transmitting a braking control signal to the output at a torque level equivalent to the difference between the requested torque value and the actual torque value.

12. The method as in claim 11, wherein an associated braking control device responds to decelerate the host vehicle in response to the braking control signal.

13. A system for maintaining a predetermined time gap between a host vehicle and a target comprising:
  an adaptive cruise controller communicating on a vehicle communications bus;
  a retarder controller communicating on the vehicle communications bus;
  a transmission controller communicating on the vehicle communications bus;
  a braking system controller communicating on the vehicle communications bus;
  wherein the adaptive cruise controller transmits a deceleration message in response to an actual time gap being less than a predetermined minimum time gap behind a detected target object;
  wherein the braking system controller transmits a retarder message having a requested torque value to the retarder controller in response to the deceleration message;
  wherein the adaptive cruise controller:
    receives an actual torque message having an actual torque value from the retarder controller, the received torque message having an actual torque value less than the requested torque value;

receives an engine speed value at the communications port; and transmits a transmission control message request to the transmission controller to request the transmission to shift to a lower gear in response to the engine speed being less than or equal to a minimum engine speed value.

14. The system as in claim 13, wherein an associated transmission downshifts to decelerate the host vehicle in response to the transmission control message.

15. The system as in claim 13, wherein the adaptive cruise controller further transmits a second deceleration message in response to the actual time gap being less than the predetermined time gap.

16. The system as in claim 15, wherein the braking system controller actuates an electro-pneumatic braking control device to decelerate the host vehicle in response to the second deceleration message.

* * * * *